(No Model.)
K. M. JARVIS.
FURNACE.
No. 293,966. Patented Feb. 19, 1884.
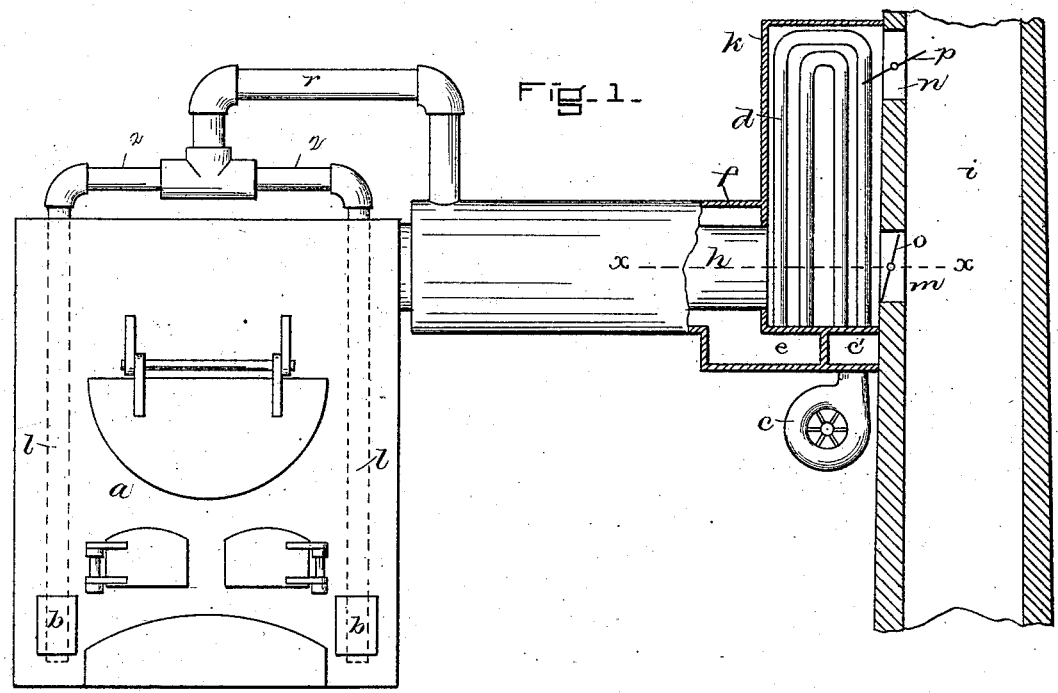
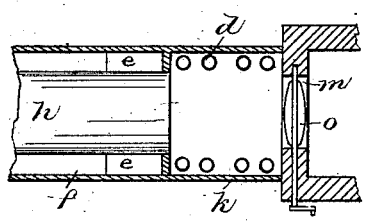
WITNESSES
Fred A. Powell
John F. C. Freinkirt
INVENTOR
Kingsbury M. Jarvis
by
Crosby Gregory
Attys.

UNITED STATES PATENT OFFICE.

KINGSBURY M. JARVIS, OF MALDEN, ASSIGNOR TO THE JARVIS ENGINEERING COMPANY, OF BOSTON, MASSACHUSETTS.

FURNACE.

SPECIFICATION forming part of Letters Patent No. 293,966, dated February 19, 1884.

Application filed May 22, 1883. (No model.)

*To all whom it may concern:*

Be it known that I, KINGSBURY M. JARVIS, of Malden, county of Middlesex, State of Massachusetts, have invented an Improvement in Furnaces, of which the following description, in connection with the accompanying drawings, is a specification, like letters on the drawings representing like parts.

My invention is intended as an improvement on a furnace of the kind described in Letters Patent No. 186,734, granted to me January 30, 1877, in which the walls of the furnace are provided with ducts, through which air is admitted to the combustion-chamber above the fuel on the grate, the air being intensely heated in the said ducts, so that it readily combines with the unconsumed gases in the furnace.

In another application filed by me March 15, 1883, I have shown and described a furnace provided with heating-ducts and an air-forcing apparatus, to supply more air to the said ducts than is drawn in by the natural draft of the furnace. In practicing this latter invention, I have found that when the amount of air supplied to the furnace above the fire is thus increased, it is desirable to heat it to a higher temperature than is produced by its rapid flow through the said ducts; and the present invention consists in the combination, with a furnace having its walls provided with ducts for heating and introducing air above the fire, and a forcing apparatus to supply the said ducts with air, of means for heating the air before entering the said ducts.

In carrying out my present invention the air is delivered from the blower or air-forcing apparatus into pipes passing through a heating-chamber, through which the products of combustion pass to the stack, the air circulating through the pipes in the said chamber, and then entering a jacket surrounding the usual sheet-metal flue leading from the furnace to the stack. The air is conveyed from the said jacket at a point near the furnace by suitable pipes or passages to the ducts in the walls of the furnace, it entering the said ducts in an already highly-heated condition, and being delivered into the furnace at a very high temperature.

Figure 1 is a front elevation of a furnace embodying this invention, the stack and heating-chamber and a portion of the jacket on the flue being shown in longitudinal vertical section; and Fig. 2 is a horizontal section on line $xx$, Fig. 1.

The furnace $a$, having passages, shown in dotted lines at $l$, leading to the ducts in the masonry walls of the boiler-setting or furnace, is substantially the same as in earlier patents granted to me, one of which has been hereinbefore referred to. The usual openings through which the air has formerly been introduced are provided with covers $b$, and the air is supplied to the said ducts by means of a forcing apparatus, shown in this instance as a centrifugal fan-blower, $c$, operated in any suitable manner. The air, instead of being conveyed directly from the blower to the ducts, is shown in this instance as first introduced to a chest, $c'$, connected by circulating-pipes $d$ with a chest, $e$, communicating with a jacket, $f$, surrounding the usual metal flue $h$, for conveying the products of combustion from the furnace to the stack $i$, the said flue $h$ in this instance opening into a heating-chamber, $k$, in which the products of combustion surround the circulating-pipes $d$ on their way to the stack $i$. The said chamber $k$ is shown as connected by two passages, $m\ n$, controlled by valves $o\ p$, with the stack, one of the said passages, as $m$, being nearly opposite the end of the flue $h$, so that when the damper $o$ therein is opened the products of combustion will pass directly across the said chamber to the stack, having comparatively slight effect upon the circulating-pipes $d$; but when the said damper $o$ is closed and the one $p$ is opened, the products of combustion will pass longitudinally through the said chamber, and thus have the maximum heating effect upon the circulating-pipes $d$ and air passing therethrough. The air, after having traversed the circulating-pipes $d$ and jacket $f$, and having become considerably heated therein, is led from the said jacket by pipes or conductors $r$ to the passages 2 and ducts in the walls of the furnace, so that the large quantity of air supplied by the blower $c$ is finally delivered in the furnace at nearly or quite as intense a heat as when a much smaller amount of air is introduced by the natural draft through the said ducts.

When the flue $h$ is of considerable length, the heating-chamber $k$ and circulating-pipes $d$ may be dispensed with; and when a sheet-metal stack is employed, as is sometimes the case, the said stack, or a portion of it, may be jacketed for the purpose of heating the air, such construction being equivalent to an extension of the flue $h$.

It is obvious that the air-passage might be inside the flue instead of a jacket surrounding it.

I claim—

1. A furnace having the air-ducts $l$, the flue $h$, leading to the smoke-stack, and the air-circulating pipes $d$, interposed between the flue $h$ and smoke-stack, and connected with the ducts $l$, combined with an air-forcing apparatus for said pipes $d$, substantially as shown and described.

2. A furnace having the heated-air ducts $l$, the flue $h$, to lead the products of combustion to the chimney or stack, the jacket $f$ therefor, connected with the ducts $l$, combined with an air-forcing apparatus, substantially as described.

3. A furnace having the heated-air ducts $l$, flue $h$ for the products of combustion, the air-circulating pipes $d$, interposed between the flue $h$ and smoke-stack or chimney, and an air-forcing apparatus therefor, combined with the jacket $f$, chamber $k$, and dampers $o$ and $p$, all substantially as shown and described.

In testimony whereof I have signed my name to this specification in the presence of two subscribing witnesses.

KINGSBURY M. JARVIS.

Witnesses:
 JOS. P. LIVERMORE,
 W. H. SIGSTON.